(12) United States Patent
Payne

(10) Patent No.: US 7,382,500 B2
(45) Date of Patent: Jun. 3, 2008

(54) VARIABLE REFLECTANCE COVER

(75) Inventor: David M. Payne, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1481 days.

(21) Appl. No.: 09/809,927

(22) Filed: Mar. 15, 2001

(65) Prior Publication Data

US 2002/0131090 A1 Sep. 19, 2002

(51) Int. Cl.
*H04N 1/04* (2006.01)

(52) U.S. Cl. .............. 358/474; 358/496; 358/497; 358/475; 358/487; 349/96; 359/63; 271/186

(58) Field of Classification Search ............. 358/474, 358/496, 497, 475, 509, 500, 505, 506, 482, 358/487; 349/96, 99; 359/63; 271/186
See application file for complete search history.

(56) References Cited

U.S. PATENT DOCUMENTS

| | | | | |
|---|---|---|---|---|
| 2,042,598 A | * | 6/1936 | Harvey | 440/53 |
| 3,936,172 A | * | 2/1976 | McVeigh | 399/7 |
| 4,012,122 A | * | 3/1977 | McVeigh | 349/3 |
| 4,043,665 A | * | 8/1977 | Caldwell | 355/76 |
| 4,903,074 A | * | 2/1990 | Lama et al. | 355/76 |
| 4,986,315 A | * | 1/1991 | Borisch et al. | 139/66 R |
| 5,422,732 A | * | 6/1995 | Takayanagi | 358/296 |
| 5,790,211 A | * | 8/1998 | Seachman et al. | 349/3 |
| 5,986,774 A | * | 11/1999 | Han | 358/487 |
| 6,031,639 A | * | 2/2000 | Hu et al. | 358/474 |
| 6,229,627 B1 | * | 5/2001 | Taguchi et al. | 358/461 |
| 6,233,064 B1 | * | 5/2001 | Griffin | 358/474 |
| 6,411,363 B1 | * | 6/2002 | Kamada et al. | 355/52 |
| 6,476,373 B1 | * | 11/2002 | Gilpin | 250/208.1 |
| 6,587,233 B1 | * | 7/2003 | Salgado | 358/505 |
| 2002/0131091 A1 | * | 9/2002 | Payne | 358/474 |

FOREIGN PATENT DOCUMENTS

JP 60074765 * 4/1985

* cited by examiner

*Primary Examiner*—Edward L. Coles
*Assistant Examiner*—Negussie Worku

(57) ABSTRACT

A variable reflectance cover for a scanning system. The cover comprises a backing moveable through a plurality of positions. Moving the backing through the plurality of positions varies the reflectance of the cover. In one embodiment, the backing is an endless rotatable belt. In a second embodiment, the backing is a removable panel having a first side with a first reflectance and a second side with a second reflectance. In yet a third embodiment, the backing includes polarizers placed adjacent to a reflective panel. Rotating one polarizer relative to another varies the reflectance of the cover.

9 Claims, 8 Drawing Sheets

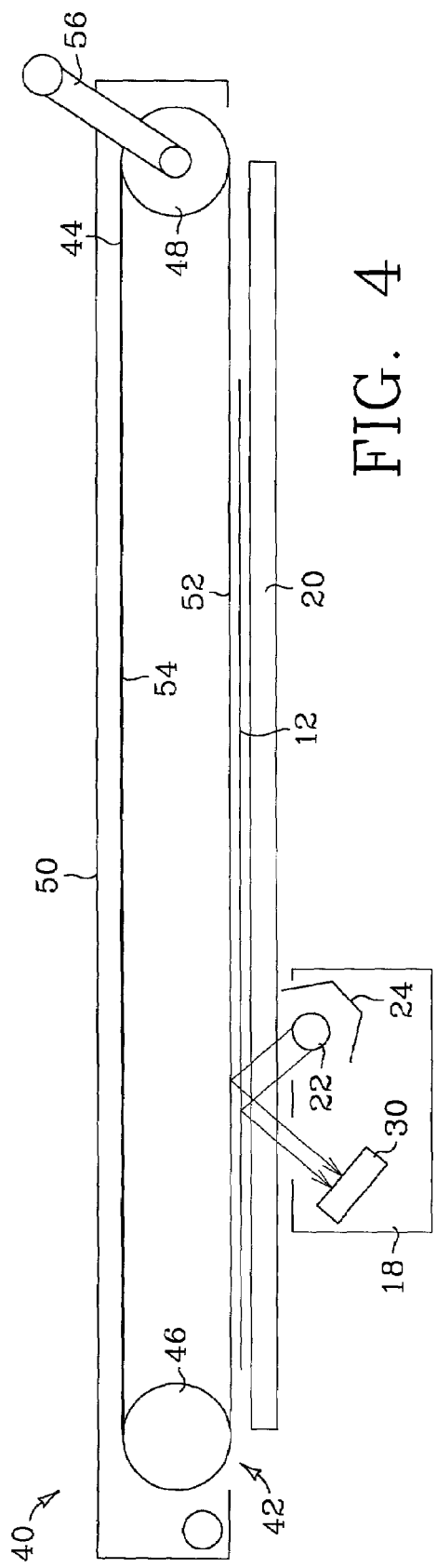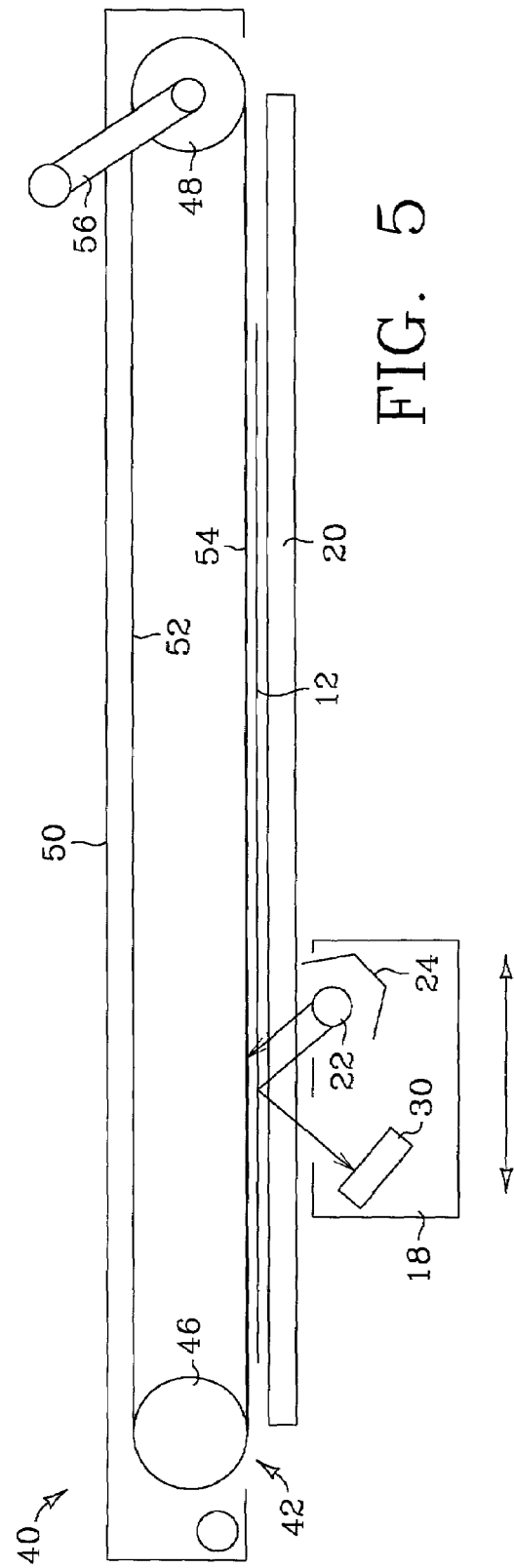

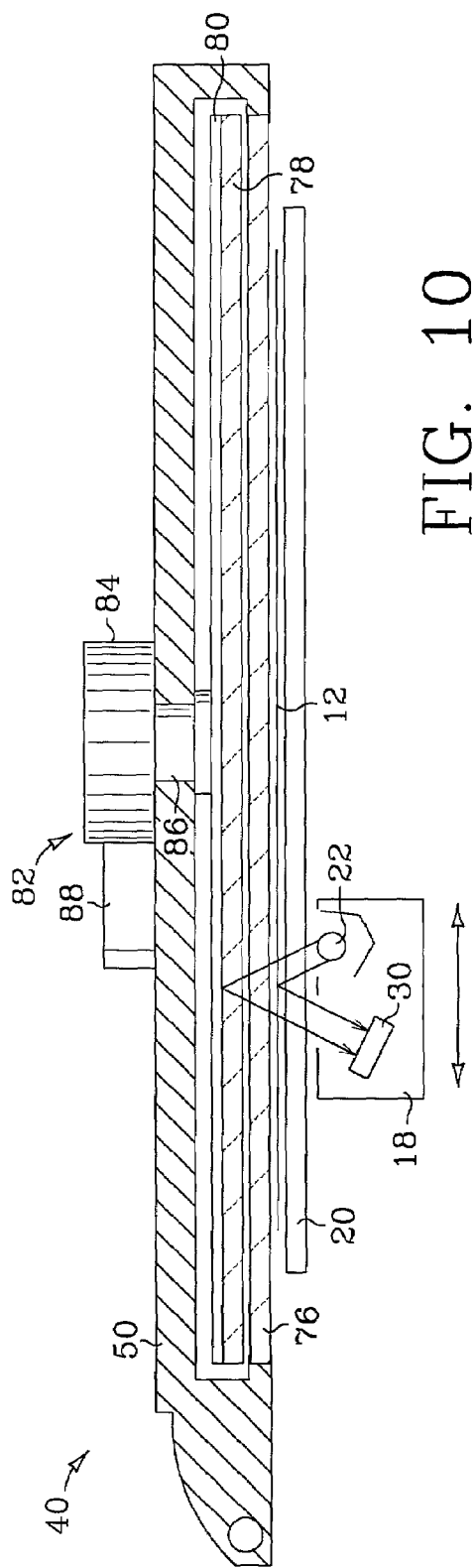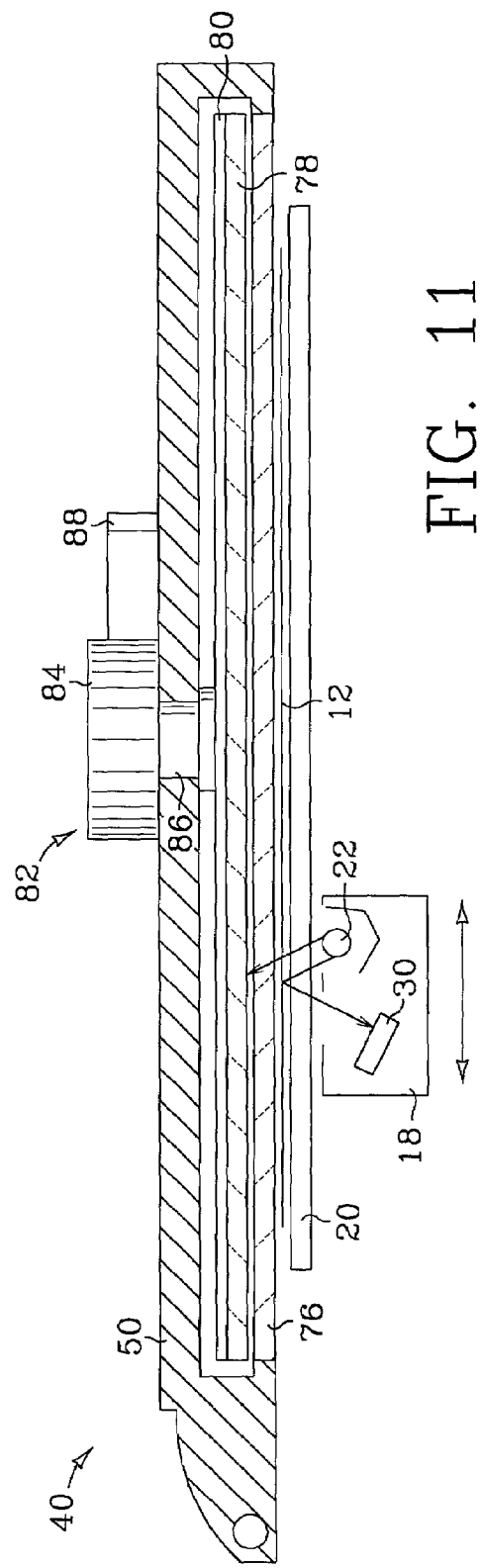

VARIABLE REFLECTANCE COVER

FIELD OF THE INVENTION

The present invention relates to a cover for a scanning system, and more particularly to a cover with a variable reflective backing.

BACKGROUND

An optical scanner is used to generate an electronic file, a bitmap file for example, which is representative of a scanned object such as a document or photograph. This is typically accomplished by passing a controlled light source across the surface of the object. Light reflects off the surface of the object and back onto an array of photosensitive devices such as a charge coupled device, or CCD, array. As the light source passes over the object, the CCD array converts the reflected light intensity into an electronic signal that is ultimately digitized into an electronic file once the entire object is scanned.

In a conventional flatbed scanner, the light source and CCD array are located in a base covered by a plane of transparent glass. The object being scanned is placed, or sandwiched, between the glass plane and a cover. The inside surfaces of some covers are constructed of a high reflectance white material. The high reflectance white surface enables the conventional scanner to reduce or eliminate dark borders around the document, black circles where punch holes exist, and dark borders around multiple images such as multiple receipts on a single scan. Moreover, the high reflectance white surface enables the conventional document scanner to improve the contrast of the document's image by reflecting the light that is transmitted through the object back to the CCD array. For example, when scanning a transparency, the light passing through the transparency reflects off the white cover and is detected by the CCD array.

Although a high reflectance white surface will allow a conventional scanner to eliminate unwanted dark areas, this white surface limits the ability of the conventional scanner. More specifically, scanners have the ability to detect the location of the object being scanned. This detection enables the scanner to provide electronic registration and electronic skew correction. Moreover, the detection of the location of the object's edges enables the scanner to provide automatic magnification selection. However, this edge detection depends upon the ability of the scanner to sense the difference in the reflectance between the object and the cover. Thus, some objects would better be scanned with a black rather than white background on the cover.

A scanner with this low reflectance background cover allows for reliable edge detection, but the same background fails to suppress the black borders or punch holes. Moreover, the low reflectance background provides very low contrast when attempting to scan objects such as transparencies or semi opaque objects.

Since there are problems with using just a high or a low reflectance background with a scanner, a scanner with at least two modes of reflectance is ideal. Liquid crystal display technology has been used for scanning systems to provide a set of reflectance options. These scanning systems offer a good solution to the problem, but they are expensive. Also, if a problem arises with the liquid crystals it is not easy or inexpensive to repair. In many cases it is less expensive to purchase a new scanner rather than attempting to repair a liquid crystal cover.

SUMMARY

The present invention is directed to a variable reflectance cover for a scanning system. The cover comprises a backing moveable through a plurality of positions. Moving the backing through the plurality of positions varies the reflectance of the cover. In one embodiment, the backing is an endless rotatable belt. In a second embodiment, the backing is a removable panel having a first side with a first reflectance and a second side with a second reflectance. In yet a third embodiment, the backing includes polarizers placed adjacent to a reflective panel. Rotating one polarizer relative to another varies the reflectance of the cover.

DESCRIPTION OF THE DRAWINGS

FIGS. 4 and 5 are side views of a cover having a rotatable endless belt with high and low reflectance sections. In FIG. 4, a high reflectance section is positioned adjacent to a scanning surface. In FIG. 5, a low reflectance section is positioned adjacent to a scanning surface.

FIG. 10 is a section view taken along the line 10-10 in FIG. 9 wherein the adjacent polarizers allow light to pass through and reflect off the backing.

FIG. 11 is a section view taken along the line 11-11 in FIG. 9 wherein the adjacent polarizers are rotated to absorb light before reaching the backing.

DETAILED DESCRIPTION

Figure 1:
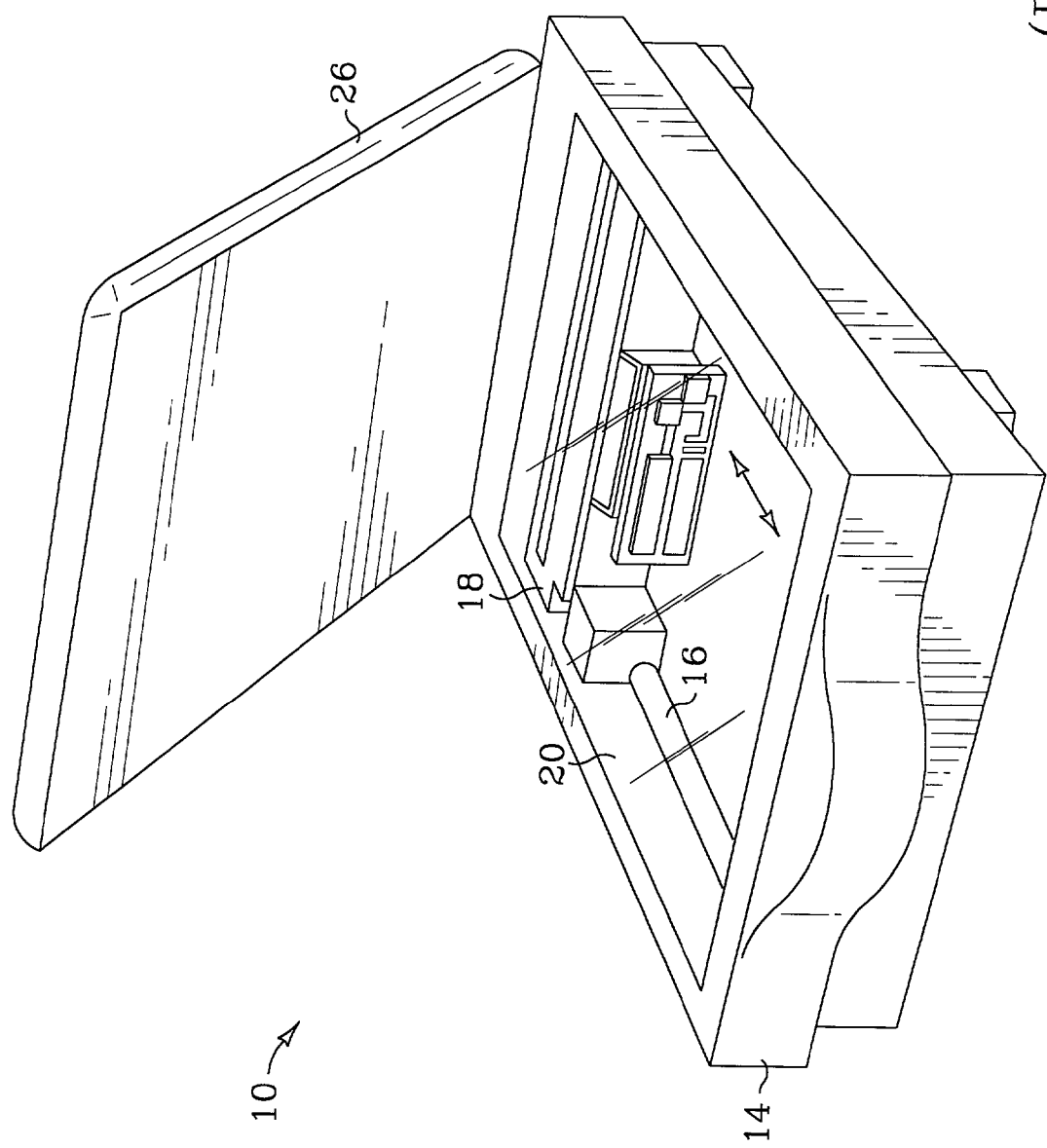
FIG. 1 is a perspective view of a flat bed optical scanner with a conventional cover.
Figure 2:
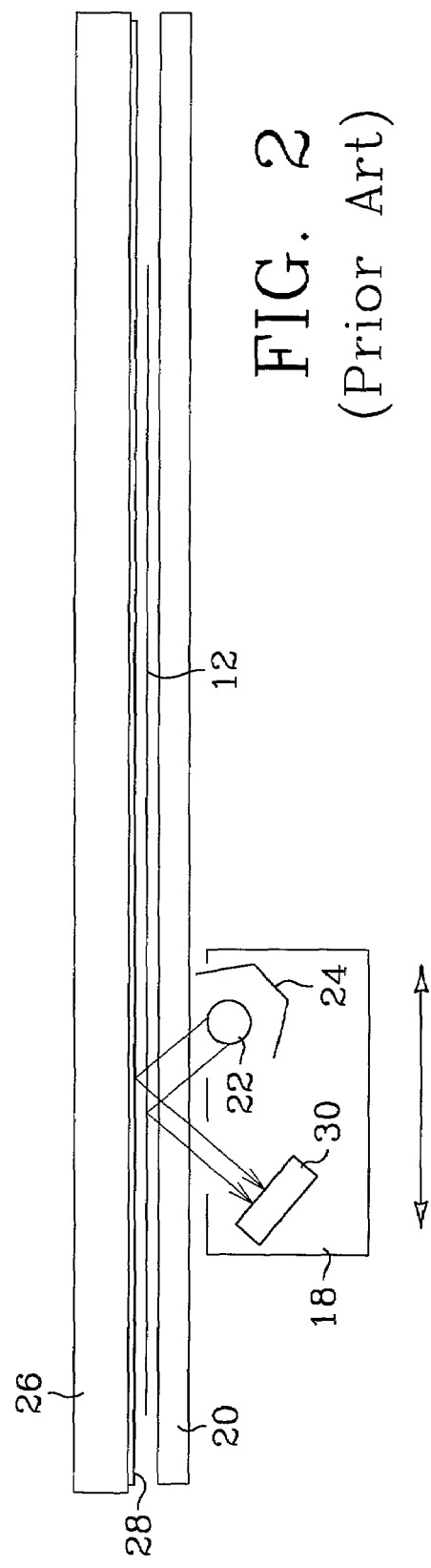
FIG. 2 is a side view of the scanner of FIG. 1 having a cover with a high reflectance backing.
Figure 3:
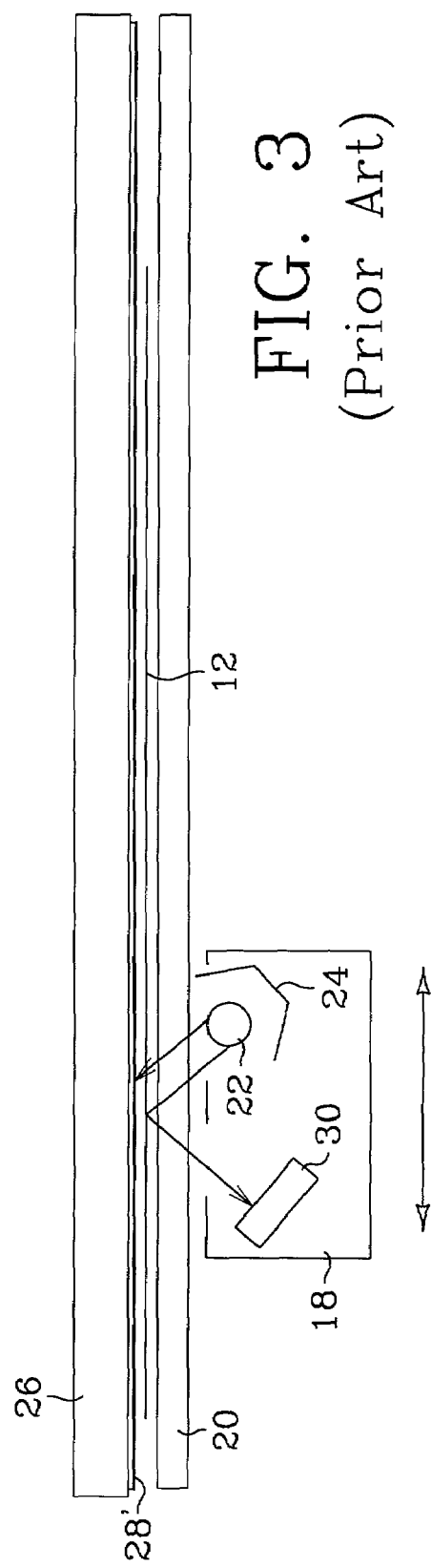
FIG. 3 is a side view of the scanner of FIG. 1 having a cover with a low reflectance backing.

FIGS. 1-3 illustrate a conventional scanner 10 used in conjunction with a computer system (not shown) for acquiring an electronic image of an object 12 (shown in FIGS. 2 and 3) such as a photograph or text document. Scanner 10 generally includes housing 14 containing guide 16 allowing linear movement of scanner carriage 18. Carriage 18 is mounted below a transparent scanning surface 20 that supports object 12. To illuminate object 12 carriage 18 includes lamp 22 and reflector 24. Lamp 22 and reflector 24 are mounted in carriage 18 to focus light up through scanning surface 20 onto object 12. Scanner 10 also includes cover 26 having backing 28.

Referring to FIGS. 2 and 3, an object 12 to be scanned is placed on scanning surface 20 and cover 26 is closed sandwiching object 12 between scanning surface 20 and backing 28. With lamp 22 illuminated, carriage 18 passes linearly underneath object 12. Light from lamp 22 reflects off object 12 back onto an array of photosensitive devices such as a charge coupled device (CCD) array 30 in carriage 18. Discerning the intensity of the reflected light, CCD array 30 generates an electrical signal allowing the computer system to produce a digitized representation of object 12.

Some light also reaches backing 28. This occurs in areas outside the edges or within punch holes of object 12. Where object 12 is transparent or opaque, some light passes directly through object 12 reaching backing 28. The backing 28 illustrated in FIG. 2 is constructed a high reflectance and generally light colored or white material. Consequently, much of the light reaching backing 28, either directly or through object 12 is reflected back to CCD array 30. The backing 28' illustrated in FIG. 3 is constructed from a low reflectance and generally dark or black material. Consequently, much if not all of the light reaching backing 28' is absorbed rather than reflected.

Figure 6:
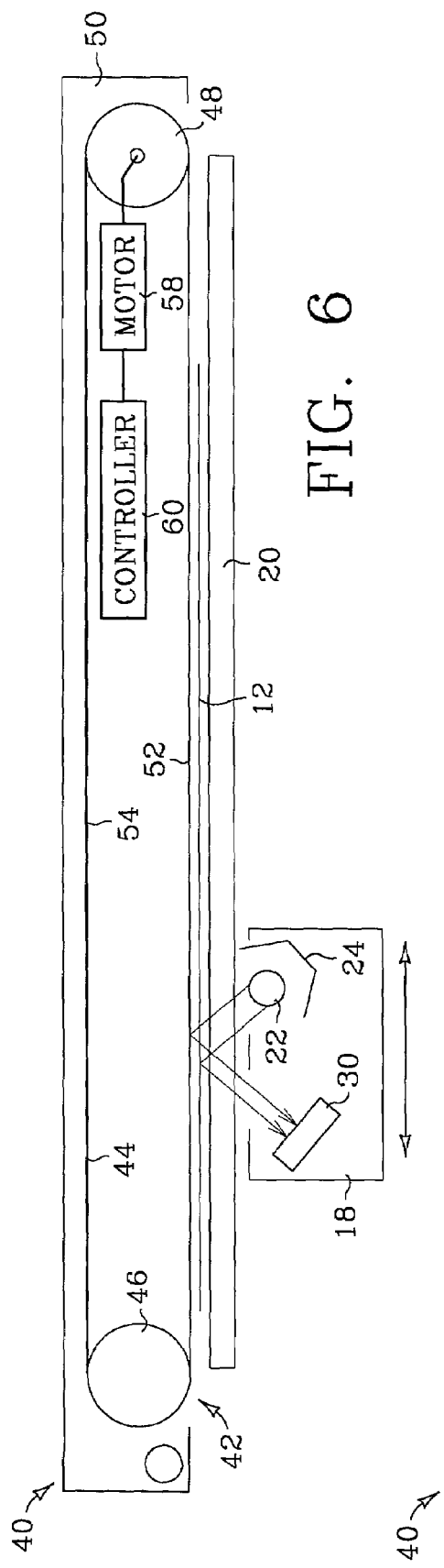
FIG. 6 is a side view of the cover of FIGS. 4 and 5 wherein the endless belt is rotated by a motor.

Referring now to FIGS. 4-12, the present invention lies in the construction of cover 40. In the embodiment illustrated in FIGS. 4-7, backing 42 is an endless belt 44 rotatable around tension rollers 46 and 48 and partially enclosed within shell 50. Endless belt 44 has a first high reflectance section 52 and a second low reflectance section 54. For example, first section 52 may be white, while second section 54 may be black. In FIGS. 4 and 5, crank 56 coupled to tension roller 48 allows endless belt 44 to be manually rotated into a desired position. Referring to FIG. 6, endless belt 44 may instead be automatically rotated by motor 58 engaging tension roller 48. It is envisioned that motor 58 will be a stepper motor accurately directed by a series of electrical pulses generated by controller 60. Advantageously, endless belt 44 can be easily removed and replaced when damaged or interchanged with another belt having sections with different levels of reflectance.

Figure 7:
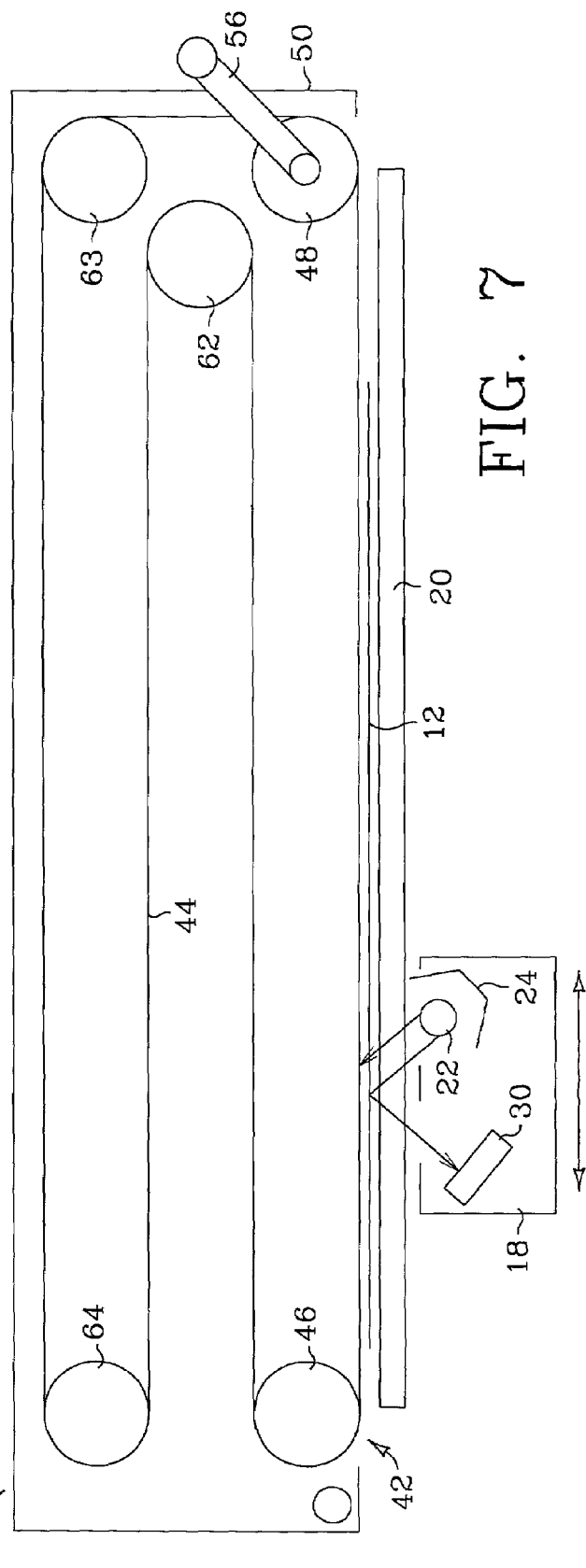
FIG. 7 is a side view of an endless belt with an increased circumference.

With first section 52 rotated into place adjacent to object 12, as shown in FIG. 4, light reaching first section 52 is reflected back to CCD array 30. With cover 40 closed and second section 54 rotated into place adjacent to object 12, light reaching backing 42 is absorbed rather than reflected. Alternatively, endless belt 44 may have more than two sections each having a specified reflectance. For example, in addition to including high and low reflectance sections, endless belt 44 can include additional sections having varying levels of reflectance. The possible combinations are infinite. The increased area needed for additional sections can be obtained by increasing the circumference of endless belt 44. This increased circumference can be managed with additional tension rollers 62, 63, and 64 as illustrated in FIG. 7.

Figure 8:
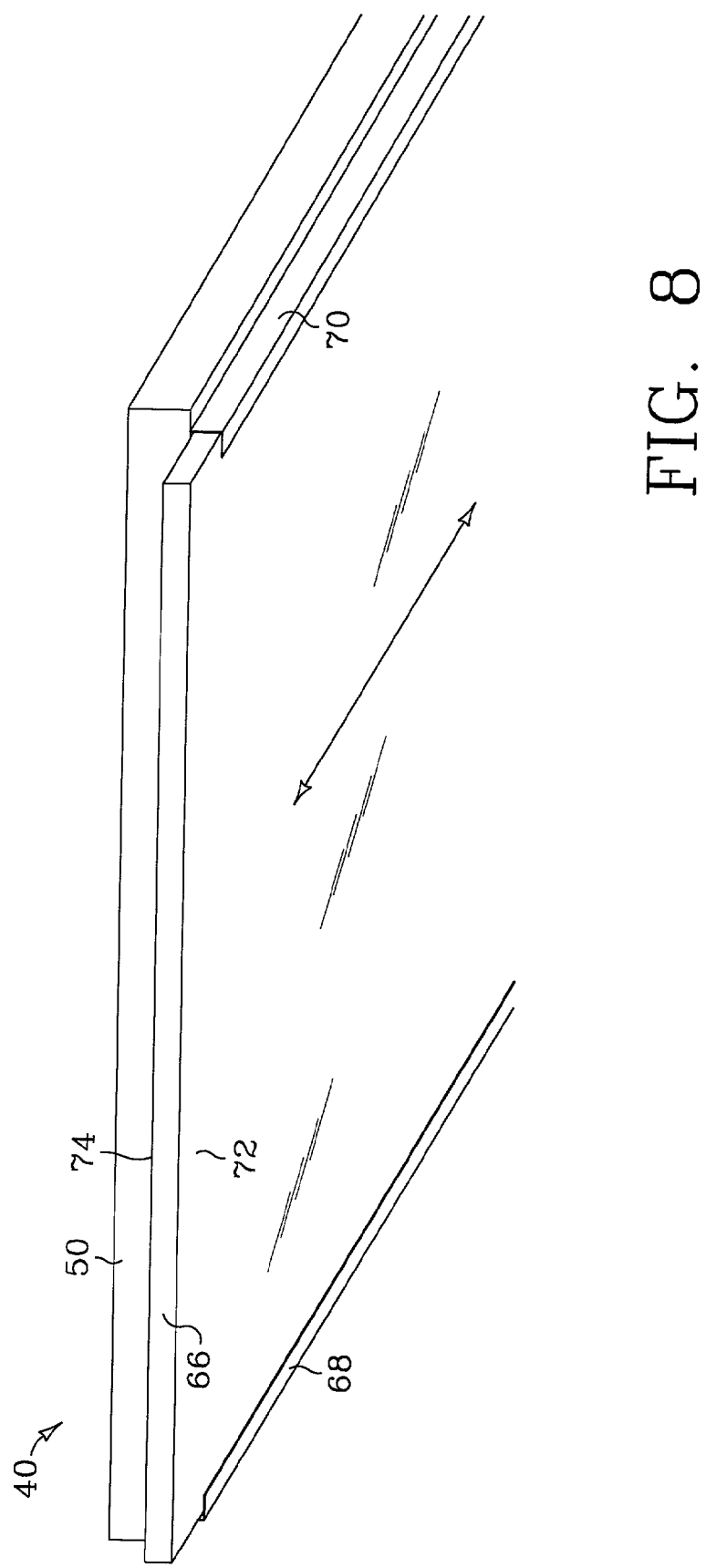
FIG. 8 is an isometric view of a cover having a removable panel.

In the embodiment of cover 40 illustrated in FIG. 8, backing 42 is a removable panel 66 held in a slot created by grips 68 and 70. Panel 66 has a first side 72 having a first reflectance and a second side 74 having a second reflectance. With cover 40 open, panel 66 can be manually removed and replaced so as to expose either the first or the second side 72 or 74. For example, first side 72 may be white and second side 74 may be black. Where a backing with a high reflectance is desired, panel 66 is placed between grips 68 and 70 such that first side 72 is exposed. When cover 40 is then closed, first side 72 will be immediately adjacent to the object being scanned. When a backing with a low reflectance is desired, panel 66 is removed and replaced such that second side 74 is exposed. Panel 66 can be easily replaced if damaged or can be interchanged with another panel when other reflectance levels are desired.

In the embodiment of cover illustrated in FIGS. 9-12, backing 42 includes a first polarizer 76, second rotatable polarizer 78 affixed to reflective panel 80. Polarizers 76 and 78 are rotatable relative to one another in order to vary the amount light from lamp 22 that reaches reflective panel 68.

Light can be represented as a transverse electromagnetic wave. Imagine, for example, a length of rope held by two children at opposite ends, the children begin to displace the ends of the rope in such a way that the rope moves in a plane either up and down, left and right, or any angle in between. Ordinary white light is made up of such waves that fluctuate at all possible angles.

Light is considered to be linearly polarized when it contains waves that only fluctuate in one specific plane. It is as if the rope in the example is strung through a picket fence. The wave can only move up and down in a vertical plane. A polarizer is a material that only allows only light with a specific angle of vibration to pass through while it absorbs the rest. The direction of fluctuation passed by the polarizer is referred to as the polarizer's optical axis. If two polarizers are set up in series so that their optical axes are parallel, light passes through both. However, if the polarizers are rotated relative to one another until their optical axes are perpendicular, the polarized light passing through the first will be absorbed by the second. As the polarizers are rotated in relation to one another and the angle between their optical axes varies from zero to ninety degrees, the amount of light passing through both polarizers decreases proportionally.

In FIG. 10, the optical axes of the first and second polarizers 76 and 78 are parallel. In FIG. 11, polarizer 78 is rotated until those axes are perpendicular to one another. FIG. 10 illustrates the configuration generating a maximum effective reflectance with the greatest amount of light reaching reflective panel 80 and reflecting back to CCD array 30. FIG. 11, on the other hand, illustrates the configuration producing a minimum effective reflectance with polarizers 76 and 78 absorbing all light before it reaches reflective panel 80. The effective reflectance can be tuned to any desired level between the minimum and maximum levels by adjusting the angle between the optical axes of polarizers 76 and 78.

Figure 9:
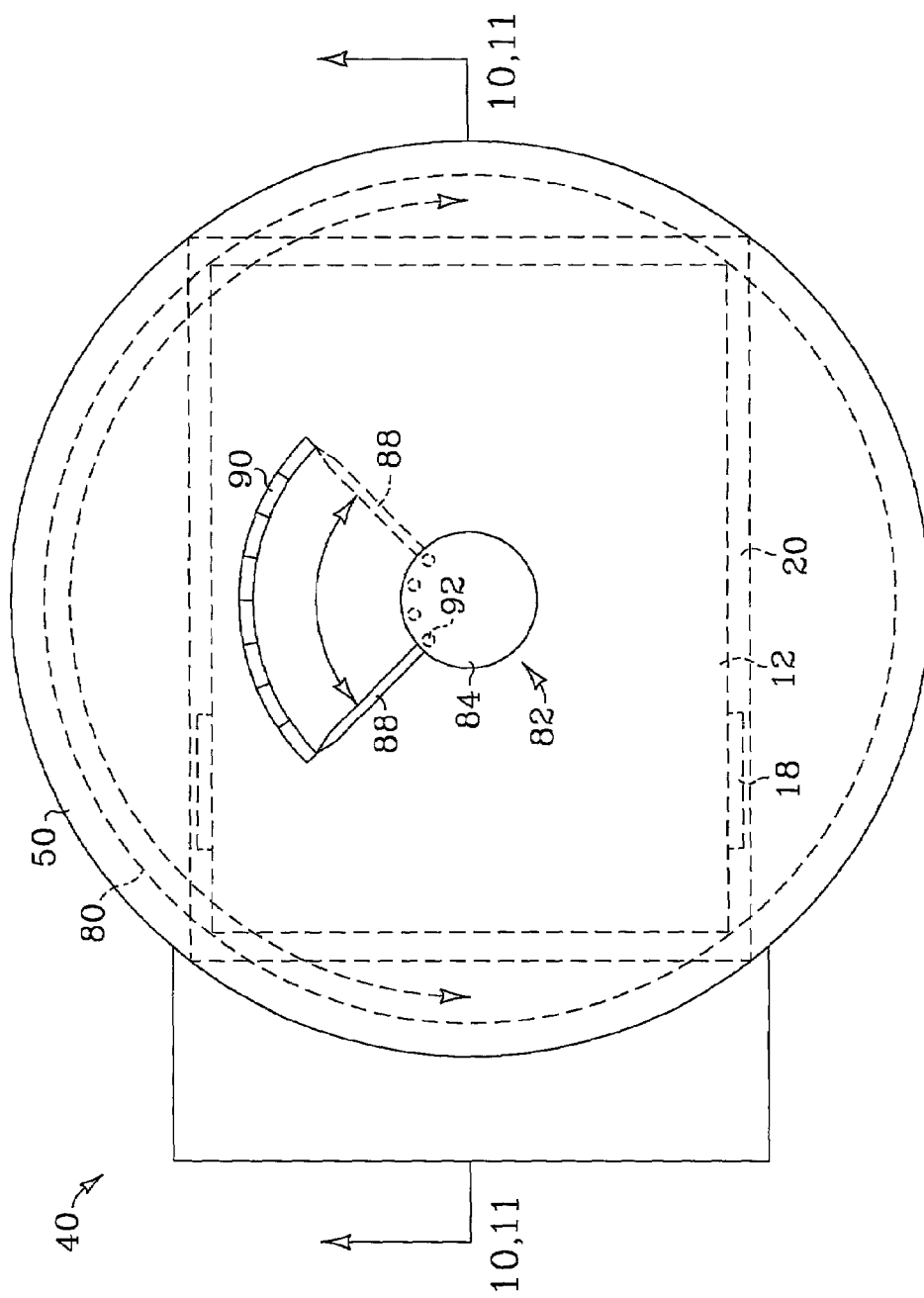
FIG. 9 is a top plan view of a cover having adjacent rotatable polarizers.
Figure 12:
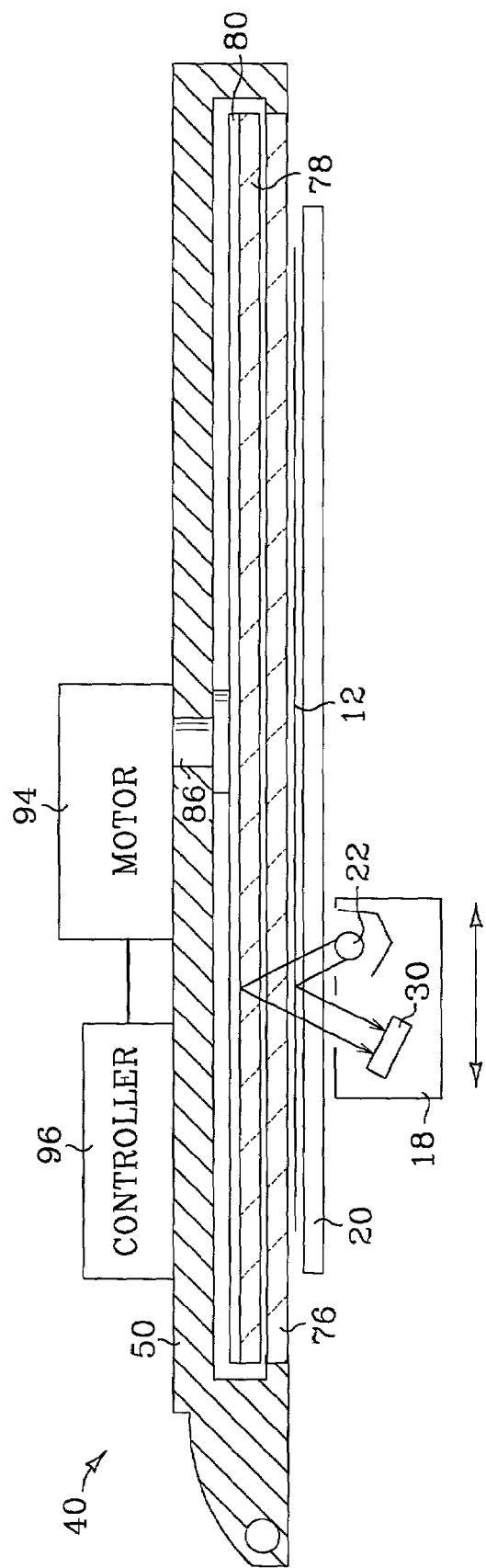
FIG. 12 is a section view of the cover of FIG. 9 including a motor for rotating one of the polarizers.

In the embodiment illustrated in FIGS. 9-11, second polarizer 78 and attached reflective panel 80 are manually rotated using dial 82. Dial 82 includes knob 84 coupled to shaft 86 passing through shell 50. Shaft 86 is then coupled to reflective panel 80. Turning knob 84 rotates reflective panel 80 and the attached second polarizer 78. In one version, dial 82 may also include lever 88 and gauge 90. Lever 88 extends radially outward from knob 84 across the surface of shell 50 allowing for a more accurate rotation and placement of second polarizer 78. Lever 88 is placed such that when it points to one end of gauge 90, the optical axes of polarizers 76 and 78 are parallel. When lever 88 is rotated so that it points to the other end of gauge 90, the optical axes of polarizers 76 and 78 are perpendicular. Cover 40 may include stops 92 for holding dial 82 and joined second polarizer 78 stationary in one of many predetermined positions. Alternatively, second polarizer 78 can be automatically rotated by motor 94 as illustrated in FIG. 12. It is envisioned that motor 94 will be a stepper motor accurately directed by a series of electrical pulses generated by controller 96.

Although the invention has been shown and described with reference to the foregoing exemplary embodiments, it is to be understood that other embodiments are possible, and variations of and modifications to the embodiments shown and described may be made, without departing from the spirit and scope of the invention as defined in following claims.

What is claimed is:

1. A variable reflectance cover for a scanning system, comprising a backing moveable through a plurality of positions, wherein moving the backing through the plurality of positions varies the reflectance of the cover, wherein the backing is a removable panel moveable between a first position in which a first side of the panel is at least partially exposed and a second position in which a second side of the panel is at least partially exposed.

2. The cover of claim 1, wherein the first side has a first reflectance and the second side has a second reflectance different from the first reflectance.

3. The cover of claim 2, wherein the first side is white and the second side Is black.

4. A variable reflectance cover for a scanning system, comprising:
   a plurality of adjacent polarizers, at least one of the polarizers being rotatable in relation to another polarizer; and
   a reflective panel located adjacent to the polarizers;
   wherein rotating one of the polarizers alters the reflectance of the cover.

5. The cover of claim 4, wherein at least one of the polarizers is detachable from me cover.

6. The cover of claim 4, further comprising a mechanical dial operatively connected to one of the polarizers, the dial when manually rotated causes the connected polarizer to rotate in relation to another polarizer.

7. The cover of claim 4, further comprising a motor operative to selectively rotate one of the polarizers in relation to another polarizer.

8. The cover of claim 7, further comprising a controller placed in electrical communication with the motor, the controller being configured to direct the motor to accurately rotate one of the polarizers in relation to another polarizer.

9. A variable reflectance cover for a scanning system, comprising:
   a shell;
   two adjacent polarizers, at least one of the two polarizers being rotatable in relation to the other polarizer; and
   a reflective panel located adjacent to the polarizers and between the polarizers and the shell;
   wherein the polarizers and the reflective panel are at least partially contained within the shell and rotating one of the polarizers alters the reflectance of the cover.

* * * * *

UNITED STATES PATENT AND TRADEMARK OFFICE
CERTIFICATE OF CORRECTION

| | |
|---|---|
| PATENT NO. | : 7,382,500 B2 |
| APPLICATION NO. | : 09/809927 |
| DATED | : June 3, 2008 |
| INVENTOR(S) | : David M. Payne |

Page 1 of 1

It is certified that error appears in the above-identified patent and that said Letters Patent is hereby corrected as shown below:

In column 5, line 11, in Claim 3, after "side" delete "Is" and insert -- is --, therefor.

In column 5, line 21, in Claim 5, delete "me" and insert -- the --, therefor.

Signed and Sealed this

Twelfth Day of May, 2009

JOHN DOLL
*Acting Director of the United States Patent and Trademark Office*